(12) United States Patent
Kato

(10) Patent No.: US 6,940,819 B2
(45) Date of Patent: Sep. 6, 2005

(54) INTERNET TELEPHONE APPARATUS AND METHOD FOR AN INTERNET TELEPHONE SET

(75) Inventor: Tatsuya Kato, Tokyo (JP)

(73) Assignee: NEC Corporation, Tokyo (JP)

(*) Notice: Subject to any disclaimer, the term of this patent is extended or adjusted under 35 U.S.C. 154(b) by 868 days.

(21) Appl. No.: 09/832,782

(22) Filed: Apr. 11, 2001

(65) Prior Publication Data

US 2001/0030944 A1 Oct. 18, 2001

(30) Foreign Application Priority Data

Apr. 12, 2000 (JP) ........................................ 2000-110354

(51) Int. Cl.[7] .................. G01R 31/08; G06F 11/00; H04J 1/16; H04J 3/14; H04L 1/00
(52) U.S. Cl. .................. 370/237; 370/235; 370/230; 370/231
(58) Field of Search ................. 370/252, 359, 370/360, 387, 388, 386, 422, 494–496, 901, 902, 242, 244, 395.5, 39, 426, 466, 465, 469, 463, 401, 237, 235, 236, 229, 230, 230.1, 231, 236.1, 236.2, 233, 234, 400, 351–357, 216–221; 379/219, 220.01, 221.01, 221.03, 221.04, 93.08, 93.14, 93.07, 900, 93.09

(56) References Cited

U.S. PATENT DOCUMENTS 5,991,291 A * 11/1999 Asai et al. .................. 370/352
6,014,687 A * 1/2000 Watanabe et al. ........... 709/204
6,222,859 B1 * 4/2001 Yoshikawa .................. 370/522
6,600,735 B1 * 7/2003 Iwama et al. ............... 370/352
6,754,181 B1 * 6/2004 Elliott et al. ................. 370/252

FOREIGN PATENT DOCUMENTS

| JP | 2-67042 | | 3/1990 | |
|---|---|---|---|---|
| JP | 9-36877 | | 2/1997 | |
| JP | 9-172459 | | 6/1997 | |
| JP | 2000151680 A | * | 5/2000 | ........... H04L/12/46 |

* cited by examiner

Primary Examiner—Wellington Chin
Assistant Examiner—Jamal A. Fox
(74) Attorney, Agent, or Firm—Scully, Scott, Murphy & Presser

(57) ABSTRACT

A voice signal from a microphone is processed for compressing and coding in a voice compressor. The compressed voice data is input into a transmission switching section. The transmission switching section switches and outputs the compressed voice data to either a UDP transmitter or a TCP transmitter according to a transmission switching signal that the network situation supervisory section outputs. The transmission switching signal allows-transmission using the UDP transmitter when a network is in a situation with a margin, and transmission using the TCP transmitter when a network is in a confused situation responding to network congestion information that is obtained from a network interface. This allows a protocol transmitting the compressed voice data to be selected corresponding to a congested situation of the network, and thereby a voice call without interruption can be obtained even though the network is in a confused and low-quality situation.

7 Claims, 8 Drawing Sheets

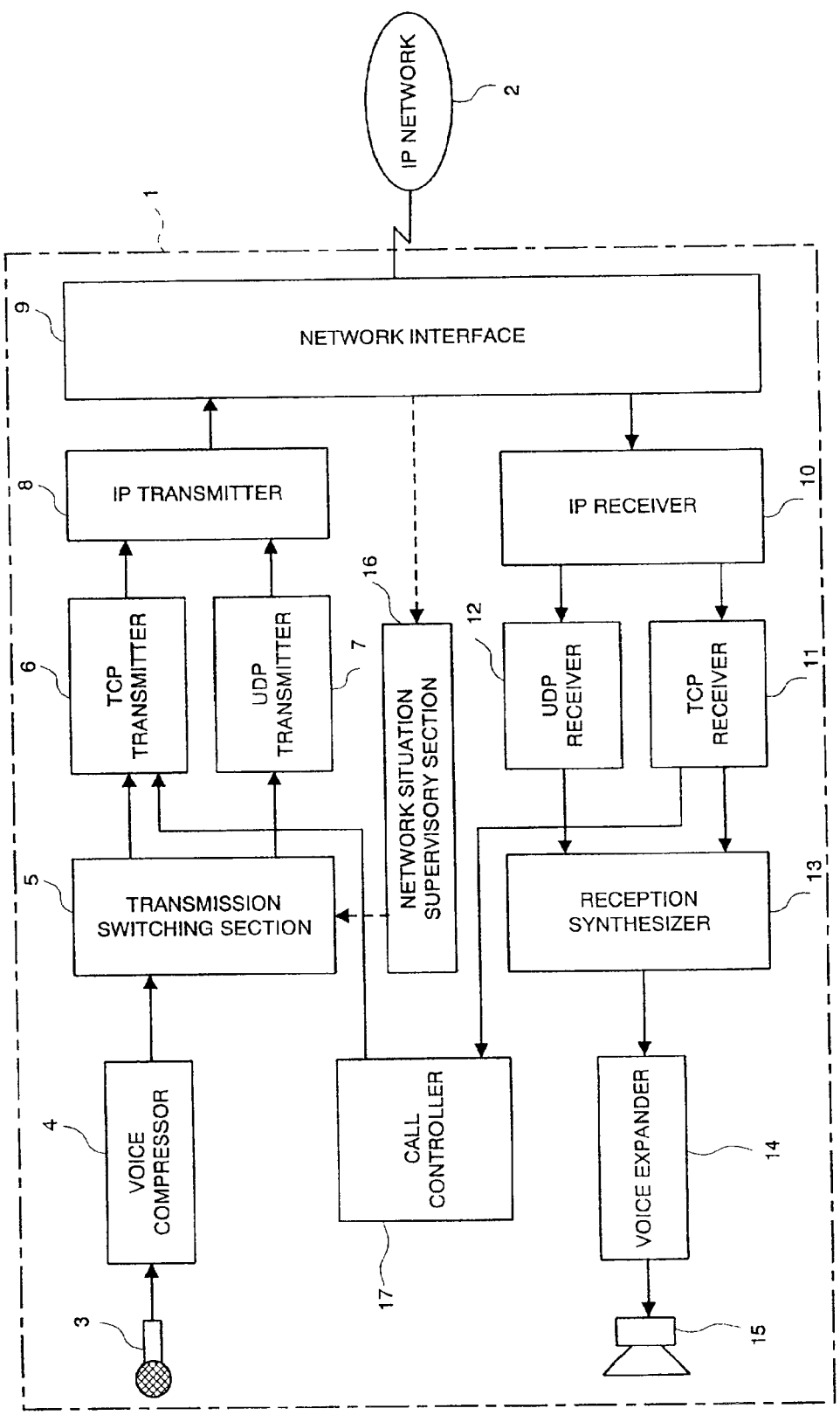

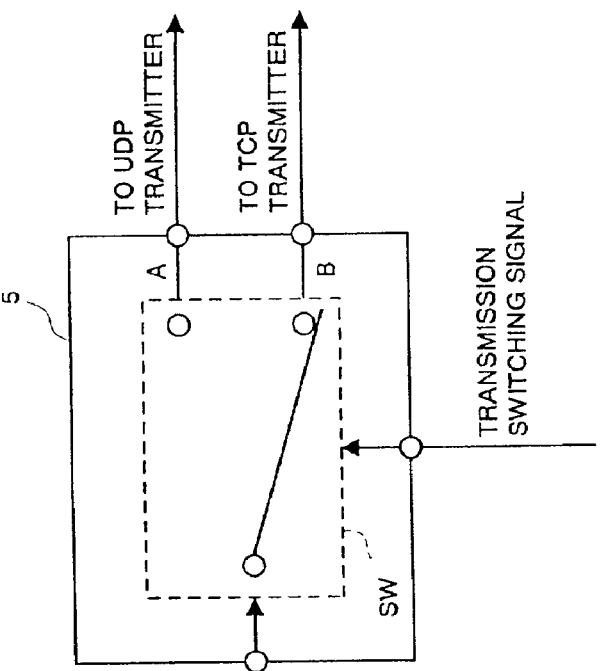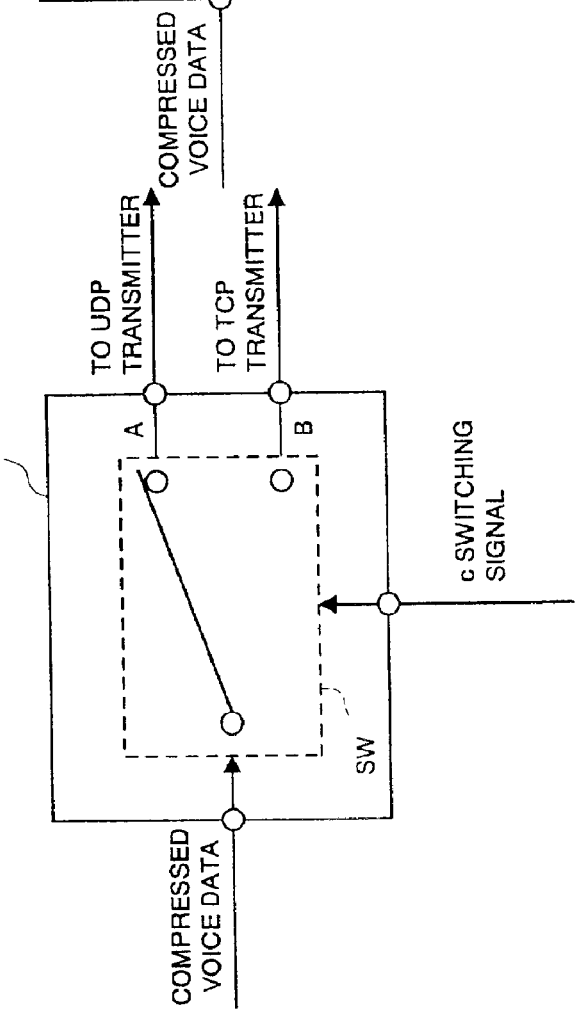

INTERNET TELEPHONE APPARATUS AND METHOD FOR AN INTERNET TELEPHONE SET

BACKGROUND OF THE INVENTION

The present invention relates to an internet telephone apparatus, and more particularly to an internet telephone apparatus, in which an internet or an intranet mainly having an internet protocol (IP) is employed as a communication medium.

Conventionally, in such an internet telephone a compressed and coded audio data has been transmitted and received with a UDP (User Diagram Protocol) which does not conduct an error correction and request repeat control.

For example, as shown in International Telecommunication Union Telecommunication Standardization Sector Recommendation H. 323 and Recommendation H. 225, is described the technology for conducting an audio and video communication among the apparatuses via an IP network. A terminal described in this Recommendation H. 323 is a television telephone terminal conducting an audio/video communication, but is also defined as an internet telephone terminal since an operation of the video communication is optional.

FIG. 8 is a block diagram showing one example of a conventional internet telephone apparatus.

An internet telephone apparatus 100 is connected to a companion internet telephone apparatus through a network 114 to conduct the voice and image communication. An audio I/O 101 records voice of a speaker by means of a microphone and so forth to output a voice signal to an audio CODEC 102 and to simultaneously regenerate by means of a speaker and so forth the receiving voice signal that the audio CODEC 102 outputs.

The audio CODEC 102 processes for compressing and coding the voice signal that the audio I/O 101 outputs to output the compressed voice data to a H. 225 layer 112 through a reception channel delay 103. A video I/O 105 which is optional takes image of the speaker by means of a video camera and so forth to output an image signal to a video CODEC 104 and to simultaneously paint on a display device and so forth the receiving video signal that the video CODEC 104 outputs. A video CODEC 104 which is optional processes for compressing and coding the video signal that is input from the video I/O 105 to output the compressed image data to the H. 225 layer 112 through the reception channel delay 103. In the process for compressing and coding which is optional, either ITU-T H. 261 or ITU-T H. 263 is employed for compressing and coding of video.

The reception channel delay 103 generates delay when discrepancy between regeneration voice and paint video occurs, depending upon a transmission line situation, in case that the internet telephone apparatus conducts the audio/video communication with the companion internet telephone apparatus. A user data application and so forth 106 executes an application utilizing a user data channel of a television telephone apparatus. In a system controller UI 111 a system controller 107 negotiates on a call connection control to a companion terminal, an operational mode and so forth. The system controller 107 is constructed of a call controller 108, a H. 245 controller 109 and a RAS (Registration Admission Status) controller 110.

The call controller 108 conducts a call connection/disconnection control to/from the companion internet telephone apparatus according to the Recommendation H. 225. The H. 245 controller 109 negotiates with the companion internet telephone apparatus on the operational mode and so forth according to the Recommendation H. 245. The RAS controller 110 conducts a conference management and so forth to a gate keeper (GK). The H. 225 layer 112 inputs/outputs the compressed voice data from/to the audio CODEC 102, the compressed image data from/to the video CODEC 104 respectively to transmit/receive a TCP/IP data and a UDP/IP data to/from a Network I/F 113. The Network I/F 113 transmits/receives to/from the companion television telephone apparatus the TCP/IP data and the UDP/IP data that the H. 225 layer 112 inputs/outputs.

FIG. 9 is a detailed block diagram showing the H. 225 layer.

A RTP (Real Time Transfer Protocol) 120 processes for compressing and coding/expanding and decoding the compressed voice data that is input/output from/to the audio CODEC and the compressed image data that is input/output from/to the video CODEC to input/output the RTP data from/to the UDP layer. A RAS 121 inputs/outputs a RAS data from/to the UDP layer 122 based on a RAS control signal that is input/output from the RAS control. A UDP layer 122 inputs/outputs from/to an IP layer 127 the RTP data that is input/output from/to the RTP 120 and the RAS data that is input/output from/to the RAS 121.

A call signaling 123 inputs/outputs a call signaling data from/to a TCP layer 125 based on a call signaling signal that is input/output from/to a H. 225 control. A H. 245 section 124 inputs/outputs a H. 245 data from/to the TCP layer 125 based on H. 245 control information that is input/output from/to the H. 245 control. The TCP layer 125 inputs/outputs a call signaling data from/to the call signaling 123 and a H. 245 data from/to the H. 245 section to input/output a TCP data from/to a IP layer 127. The IP layer 127 inputs/outputs the TCP data from/to the TCP layer 125 and the UDP data from/to the UDP layer 122 to input/output the IP data from/to the network I/F.

Next, the operation of the prior art will be explained in reference to FIG. 8.

First, the system controller UI 111 and the system controller 107 communicate to the companion internet telephone to conduct a call connection for an audio communication. When the call is established, the audio I/O 101 records/regenerates voice, the audio CODEC 102 processes for compressing and coding/expanding and decoding voice, the compressed voice data is transmitted/received to/from the companion internet telephone apparatus, and thereby a voice communication is conducted.

Also, the operation of the H. 225 layer in this prior art will be explained in reference to with FIG. 9.

The compressed video data that is input/output from/to the RTP 120 has a RTP header added/removed in the RTP 120, is processed for a UDP protocol in the UDP layer 122, and then is transmitted/received as the UPI data to/from the companion internet telephone. Similarly, the compressed audio data that is input/output from/to the RTP 120 has the RTP header added/removed in the RTP 120, are processed for a UDP protocol processing in the UDP layer 122, and then is transmitted/received as the UDP data to/from the companion internet telephone.

However, this prior art includes the following problem to be solved.

This problem lies in interruption of voice that is received from the companion internet telephone in case that a network is confused.

The reason is that the UDP data might be destroyed or lost possibly when the network become confused since the compressed audio data is transmitted to the companion internet telephone apparatus as the UPD data that corresponded to the UDP protocol. In case that the destroyed UDP data has been received, the receiving compressed audio data could not be normally expanded and decoded, resulting in interruption of voice. Similarly, in case that the UDP data has been lost, the expanded and decoded data lacks in a real time for regenerating, resulting in interruption of voice.

SUMMARY OF THE INVENTION

Accordingly, the objective of the present invention is to solve the above-mentioned tasks.

Moreover, the objective of the present invention is to provide an internet telephone apparatus capable of maintaining call quality without interruption of voice that is received from a companion internet telephone even though a network is confused.

In accordance with the present information, an internet telephone apparatus for transmitting and receiving a call data through an internet can be obtained, the internet telephone apparatus comprising a switching controller for switching and controlling a protocol of data transfer in response to a congestion situation of said internet.

And, said switching controller is characterized by being adapted to switch to a connectionless protocol when said internet is in congestion situation below a threshold and to switch to a connection protocol when it exceeds said threshold, said connectionless protocol being a UDP (User Datagram protocol), said connection protocol being a TCP (Transmission Control Protocol).

Also, the internet telephone apparatus comprises a receiver for receiving and processing the data received through said internet, said switching controller is characterized by detecting a congestion situation of said internet based on receiving situation of this receiver, and moreover said switching controller is characterized by detecting said congestion situation based on a CRC (Cyclic Redundancy Check) error frequency of the receiving data.

Also, the internet telephone apparatus further comprises a voice compressor for compressing said call data, is characterized by being adapted to deliver this compressed voice data to said switching controller, also comprises an image compressor for compressing an image data in addition to said voice data, and is characterized by being adapted to deliver this compressed image data together with said compressed voice data to said switching controller.

And, said receiver includes an expander for expanding the compressed data of said voice and image and said switching controller is characterized by being adapted to detecting said congestion situation corresponding to a processing error of said expander for an expanding and decoding.

The internet telephone apparatus in accordance with the present invention employs an internet or an intranet mainly having an internet protocol (IP protocol) as a communication medium, wherein call quality can be maintained by switching a communication protocol transmitting a compressed voice data corresponding to a confusion situation (congestion situation) of the internet and the intranet.

Namely, a voice signal input from a microphone is processed for coding and compressing in the voice compressor. The compressed voice data that the voice compressor outputs is inputted into a transmission switching section.

The transmission switching section switches and outputs the compressed voice data to either a UDP transmitter or a TCP transmitter. Herein, a network situation supervisory section outputs a transmission switching signal that acts so as to transmit with the UDP in case that the network is in a situation with a margin and outputs the transmission switching signal that acts so as to transmit with the TCP responding to network congestion information that is obtained from an network interface.

These processes allow the protocol sending the compressed voice data to be selected responding to a situation of congestion occurrence, thus enabling to provide a voice call without interruption even though the network is in a confused and low-quality situation.

BRIEF DESCRIPTION OF THE DRAWING

This and other objects, features and advantages of the present invention will become more apparent upon a reading of the following detailed description and drawings, in which:

FIG. 2 is a block diagram showing an arrangement of an embodiment of the present invention;

FIG. 3A is a view explaining an operation of a transmission switching section 5 of FIG. 2;

FIG. 3B is a view explaining an operation of a transmission switching section 5 of FIG. 2;

DESCRIPTION OF THE EMBODIMENTS

Hereinafter, an example of an embodiment of the present invention will be explained in reference to the drawings.

Figure 1:
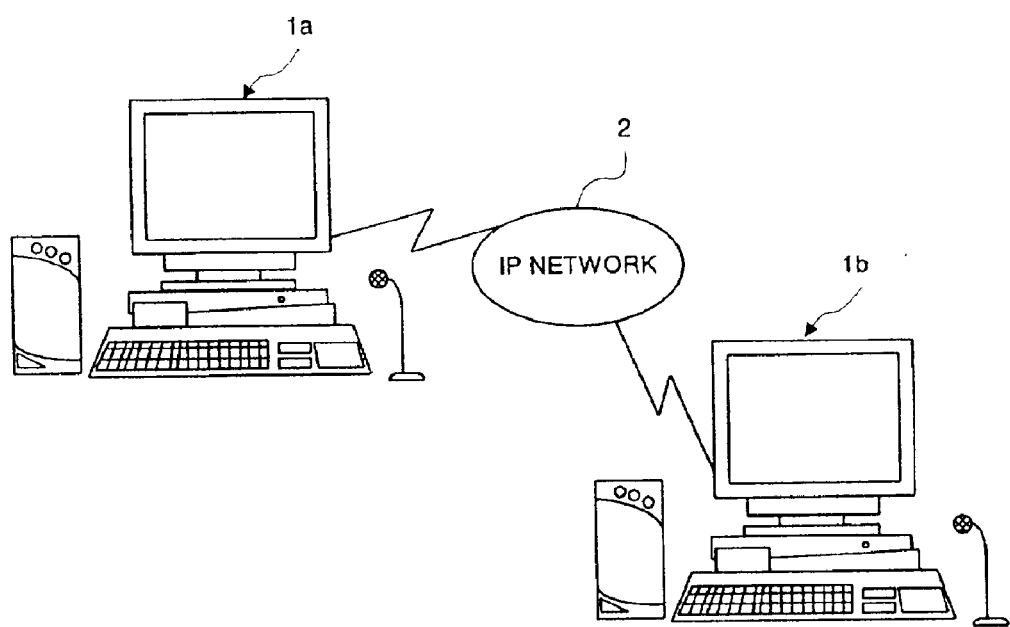
FIG. 1 is a schematic arrangement view of a system applied for an embodiment of the present invention.

Referring to FIG. 1, an internet telephone apparatus 1a is connected to a companion internet telephone apparatus 1b through an internet protocol (IP) network 2 that is typically an internet or an intranet.

FIG. 2 is a block diagram showing an example of an arrangement of internet telephone apparatuses 1a and 1b in an embodiment of the present invention.

A microphone 3 outputs voice of a speaker as a voice signal. A voice compressor 4 compresses and codes the voice signal that is input from the microphone 3 to output a transmitting compressed voice signal.

A transmission switching section 5 inputs the transmitting compressed voice signal from the voice compressor 4 and also inputs a transmission switching signal from a network situation supervisory section 16 to output the transmitting compressed voice signal to a TCP transmitter 6 or a UDP transmitter 7.

The TCP transmitter 6 processes for a TCP protocol a transmitting compressed voice data or a transmitting call control data that is input to output a transmitting TCP data to an IP transmitter 8.

Similarly, the UDP transmitter 7 processes for a UDP protocol the transmitting compressed voice data that is input to output a transmitting UDP data to the IP transmitter 8.

The IP transmitter 8 inputs the transmitting TCP data or the transmitting UDP data that is input to output a transmitting IP data to a network interface 9.

The network interface 9 transmits the transmitting IP data that has been input to a companion terminal through the IP network 2. Also, the network interface 9 outputs to an IP receiver 10 the receiving IP data received from the companion terminal through the IP network 2.

The IP receiver 10 outputs a receiving UDP data or a receiving TCP data to a UDP receiver 12 or a TCP receiver 11 according to classification of the receiving IP data that has been input.

The UDP receiver 12 processes for the UDP protocol the receiving UDP data that has been input to output a receiving compressed voice data.

Also, similarly, the TCP receiver 11 processes for the TCP protocol the receiving TCP data that has been input to output a receiving compressed voice data or a receiving call control data.

A reception synthesizer 13 processes for synthesizing the receiving compressed voice data that is input from the UDP receiver 12 and the TCP receiver 11, and the receiving compressed voice data that has been synthesized is output.

A voice expander 14 processes for decoding and expanding the receiving compressed voice data being input that has been synthesized to output a regeneration voice signal.

A speaker 15 regenerates the regeneration voice signal that the voice expander 14 outputs.

Also, a call controller 17 outputs a transmitting call control data to the TCP transmitter 6 and simultaneously the receiving call control data received from the companion terminal is input from the TCP receiver 11.

FIG. 3 is a block diagram showing an example of an arrangement of the transmission switching section 5 in an embodiment of the present invention.

A change-over switch SW is for switching transmission of the transmitting compressed voice data that is input to either the UDP transmitter 7 or the TCP transmitter 6 according to the transmission switching signal.

Figure 4:
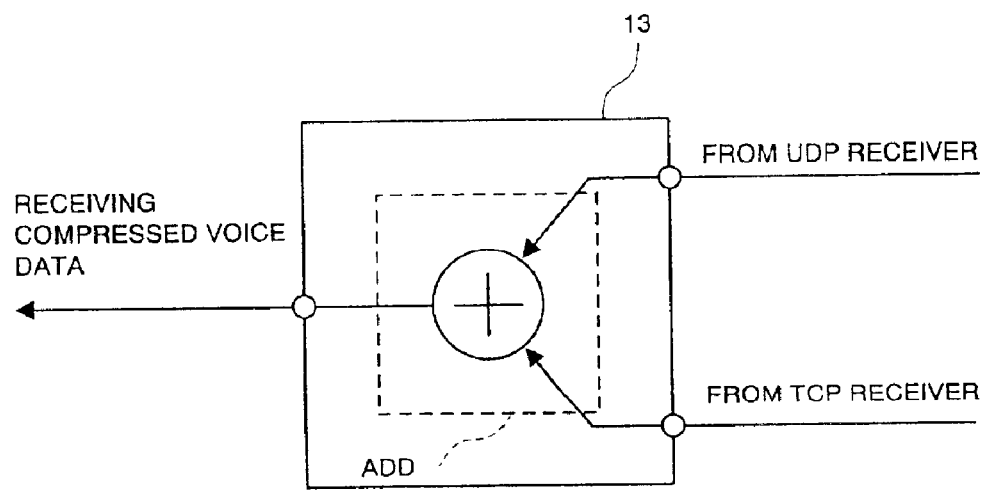
FIG. 4 is a view showing an example of a reception synthesizer 13 of FIG. 2.

FIG. 4 is a block diagram showing an example of an arrangement of the reception synthesizer 13 in an embodiment of the present invention.

An adder ADD inputs the receiving compressed voice data that is input from the UDP receiver 12 and the TCP receiver 11 respectively and process for adding to output the receiving compressed voice data that has been synthesized.

Continually, the operation of FIG. 1 will be explained.

In FIG. 1, the internet telephone apparatus 1a and the internet telephone apparatus 1b are connected to each other through the internet protocol (IP) network that is typically the internet or the intranet. An internet telephone communication is realized in that each of the internet telephone apparatuses transmit/receive the voice data and the call control data that have been compressed to/from the other.

Referring to FIG. 2, a call controller 17 conducts a call connection control for initiating communication by communicating with the call controller of a companion television telephone apparatus through the TCP transmitter 6, the IP transmitter 8, the network interface 9 and the IP network 2.

The voice signal recorded in the microphone 3 is processed for compressing and coding in the voice compressor 4 and becomes the transmitting compressed voice data. This transmitting compressed voice data is output to the transmission switching section 5.

The transmission switching section 5 selectively outputs the transmitting compressed voice data that is input to either the UDP transmitter 7 or the TCP transmitter 6 responding to a transmission switching signal that the network situation supervisory section 16 outputs.

The transmitting compressed voice data that the transmission switching section 5 selectively outputs is processed for the UDP protocol in the UDP transmitter 7 and processed for the TCP protocol in the TCP transmitter 6 respectively. The transmitting compressed voice data processed for the respective protocol is transferred to the companion terminal by the IP network 2 through the IP transmitter 8 and the network interface 9.

Also, simultaneously the receiving TCP data or the receiving UDP data that has been transferred by the IP network 2 from the companion terminal and that has been received through the network interface 9 and the IP receiver 10 is processed for the TCP protocol and the UDP protocol respectively, and is output as the receiving compressed voice data to the reception synthesizer 13.

The reception synthesizer 13 processes for synthesizing the receiving compressed voice data input from the TCP receiver 11 and the UDP receiver 12 respectively.

The receiving compressed voice data that has been synthesized is processed for expanding and decoding in the voice expander 14, and the voice of the companion terminal is finally regenerated by the speaker 15.

The network situation supervisory section 16 inputs network congestion information from the network interface 9. Therein, the network situation supervisory section 16 determines whether the current IP network 2 is in an idle situation or is in a confused situation based on the network congestion information input from the network interface 9 to output the transmission switching signal to the transmission switching section 5.

Referring to FIG. 3A, in case that the network situation supervisory section 16 outputs the transmission switching signal indicating that the network is now in an idle situation, an A side of the switch SW in the transmission switching section 5 is connected, and the receiving compressed voice data that is input from the voice compressor 4 is output to the UDP transmitter 7.

Also, referring to FIG. 3B, in case that the network situation supervisory section 16 outputs the transmission switching signal indicating a confusion situation of the network, a B side of the switch SW in the transmission switching section 5 is connected, and the receiving voice data that is input from the voice compressor 4 is output to the TCP transmitter 6.

Also, referring to FIG. 4, the receiving compressed voice data transferred from the companion terminal is input from either the UDP receiver 12 or the TCP receiver 11. The receiving compressed voice data that has been input is processed for adding by the adder ADD, and the receiving compressed voice data that has been added is output.

Figure 5:
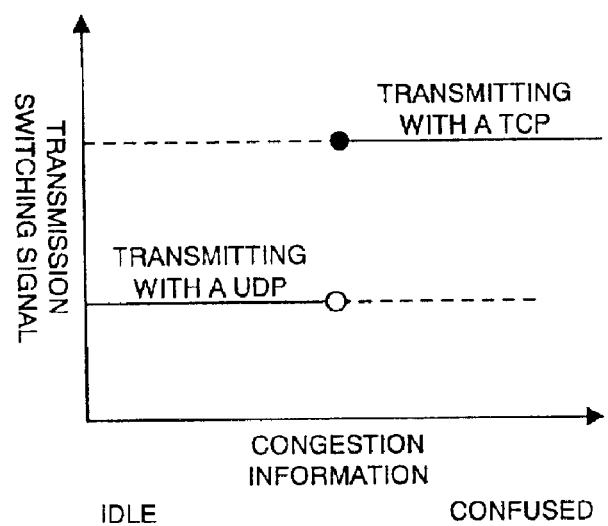
FIG. 5 is a view showing a relation between a transmission switching signal and a congestion situation.

FIG. 5 is a view explaining one example of an operation of the network situation supervisory section 16.

In case that network congestion information from the network interface indicates that the network is not confused, being in a low situation, the transmission switching signal is output which acts so that the switch SW in the transmission switching section 5 is fell to the A side (FIG. 3A). Also, in case that network congestion information from the network interface indicates that the network is confused, being in a high situation exceeding a preset threshold, the transmission switching signal is output which acts so that the switch SW in the transmission switching section 5 is fell to the B side (FIG. 3B). In general, the congestion situation of the network can be known by a packet collision and so forth.

These operations cause the compressed voice data that is transferred between terminals for a voice call to be transmitted and received with the UDP protocol, in case that the IP network 2 is in not-confused situation.

In this case, a characteristic of the UDP protocol enables real-time facility to be maintained, and accordingly the voice call is not obstructed. However, similarly the characteristic of the UDP protocol does not allows the data destroyed or lost on the IP network to be repaired or recovered, resulting in interrupting the voice call.

On the other hand, in case that the IP network 2 is in a confused situation, the compressed voice data that is transferred between terminals for a voice call is transmitted and received with the TCP protocol. In this case, a characteristic of the TCP protocol enables a transmitted data to surely reach a companion by means of a request repeat procedure even though destruction or loss of the data occurs on the IP network. Accordingly, an obstacle to the voice call due to interruption of voice does not occur.

However, similarly the characteristic of the TCP protocol does not allow real-time facility to be maintained. Namely, it becomes possible to alleviate an obstacle to the voice call due to interruption of voice at the sacrifice of real-time facility in case that the network is confused.

An example of a second embodiment will be explained.

Figure 6:
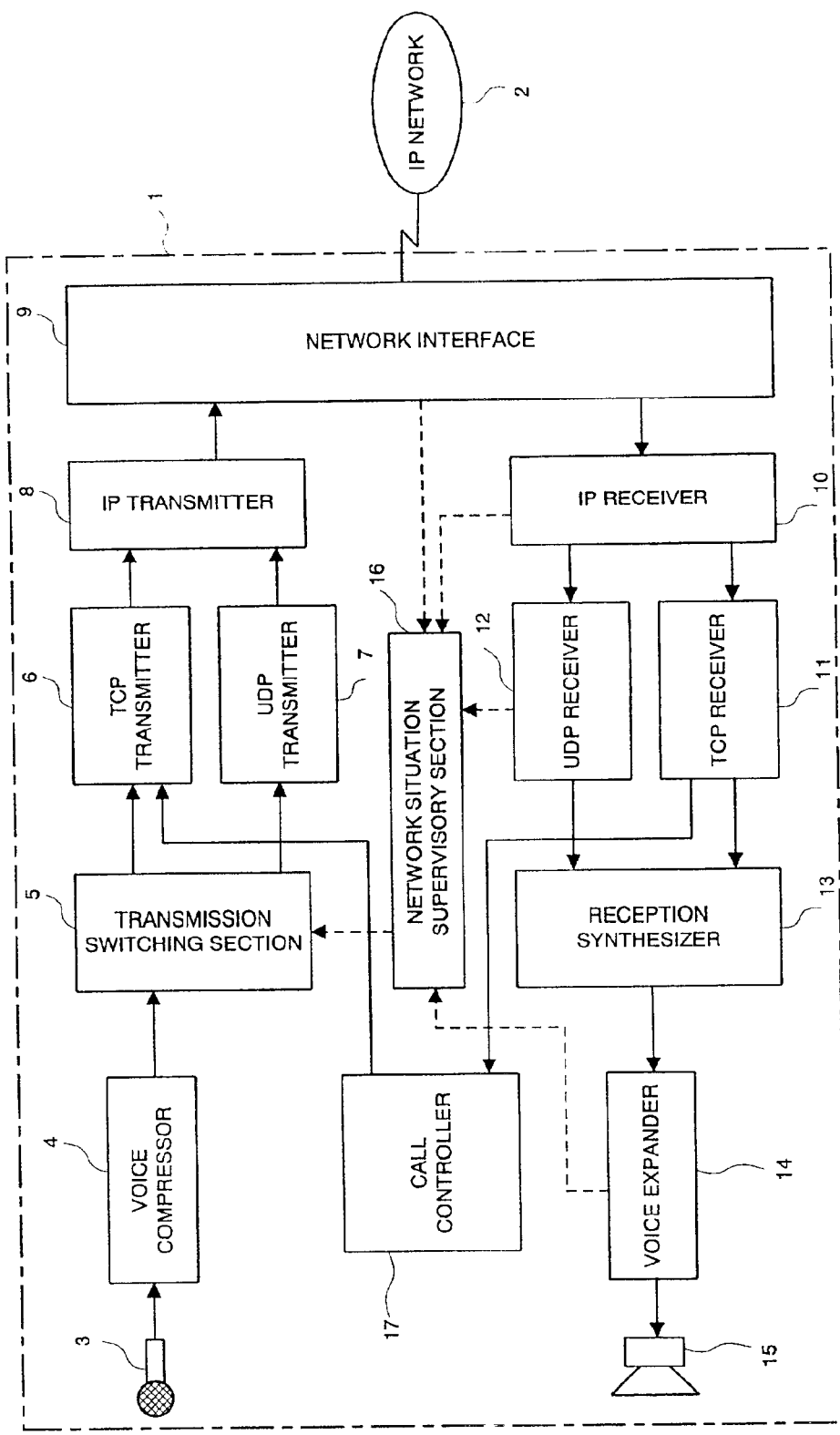
FIG. 6 is a block diagram showing an arrangement of another embodiment of the present invention.

FIG. 6 is a block diagram showing an example of a second embodiment.

Referring to FIG. 6, in addition to the arrangement shown in FIG. 2, the example of the present embodiment differs in that the IP receiver 10 outputs the congestion information of the network, and the network situation supervisory section 16 inputs the congestion information of the network not only from the network interface 9 but also from the IP receiver 10, the UDP receiver 12, and the voice expander 14.

In the IP receiver 10 the congestion information of the network, in general, can be known by a Time to live (TTL value) and so forth. In case that the TTL value is small, it means the confusion of the network. Also, in the UDP receiver 12 the congestion information of the network can be known by an error frequency of a CRC (Cyclic Redundancy Check) that is included in the UDP protocol data. It means the confusion of the network that a CRC error frequency is high.

Further, in the voice expander 14 the congestion information of the network can be known by an error frequency of processing for expanding and decoding (decode error) in the process for expanding and decoding of the compressed voice data that was received. It means the confusion of the network that an error frequency of processing for expanding and decoding is high.

An example of a third embodiment will be explained.

Figure 7:
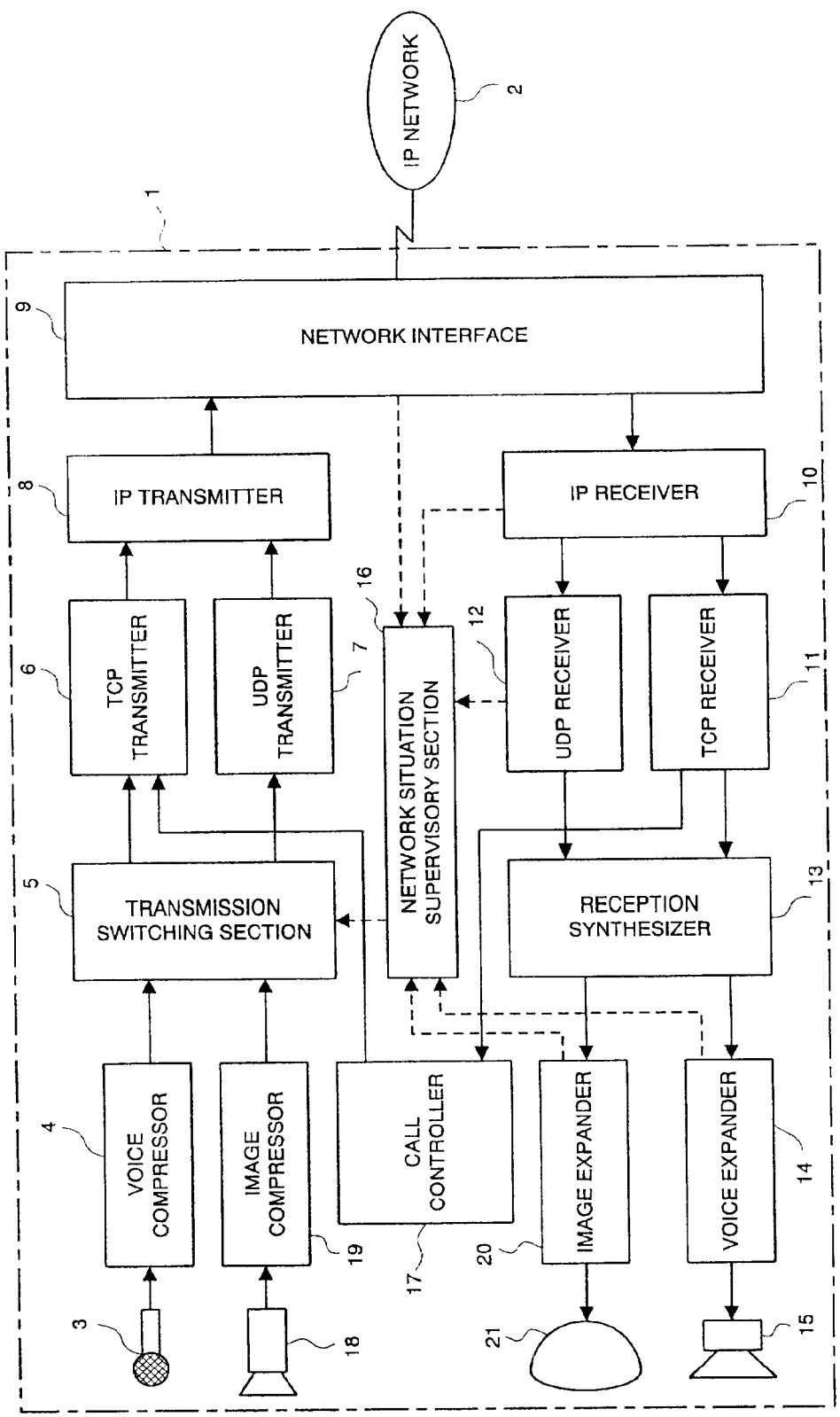
FIG. 7 is a block diagram showing an arrangement of furthermore another embodiment of the present invention.
Figure 8:
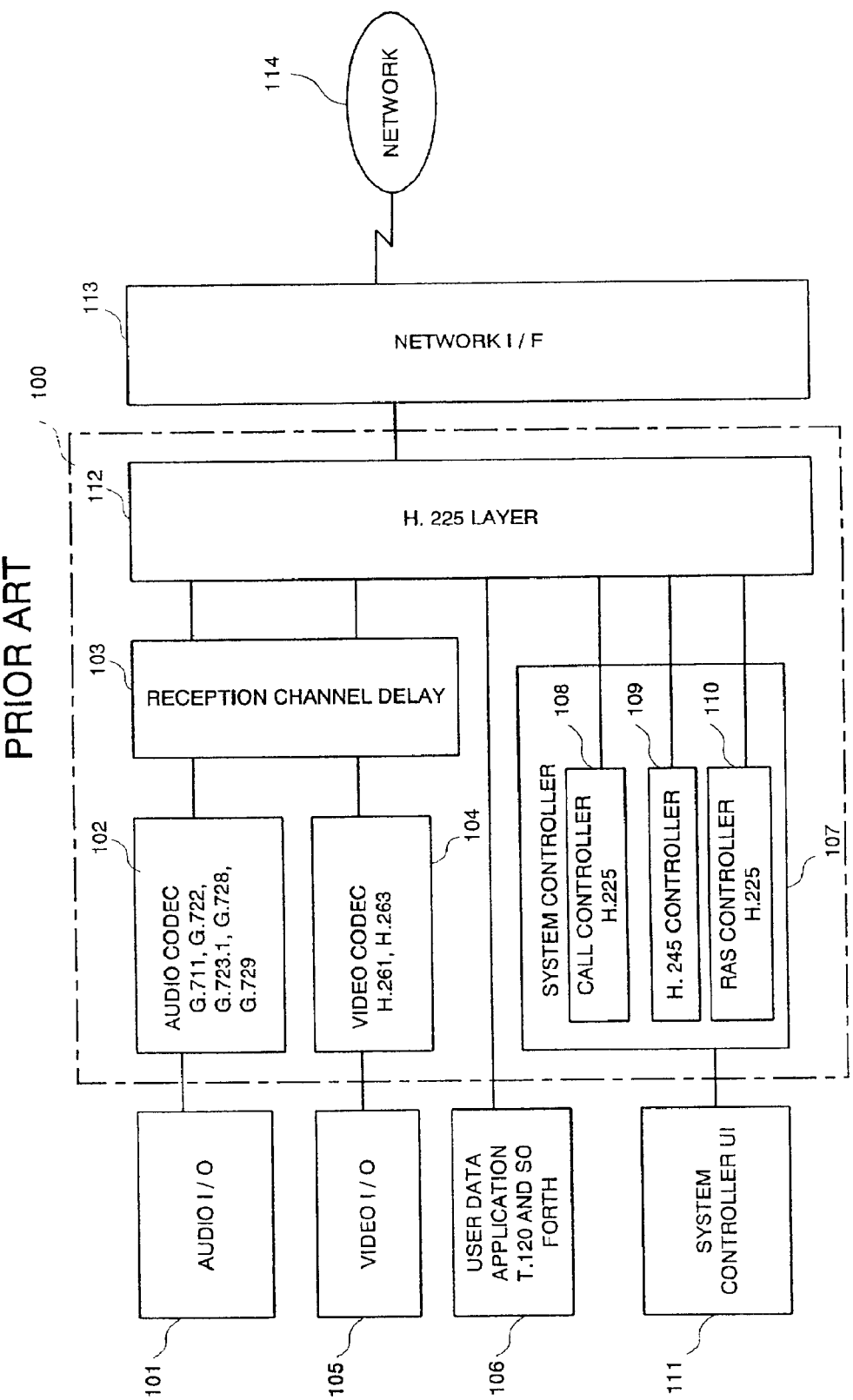
FIG. 8 is a block diagram of a conventional example.
Figure 9:
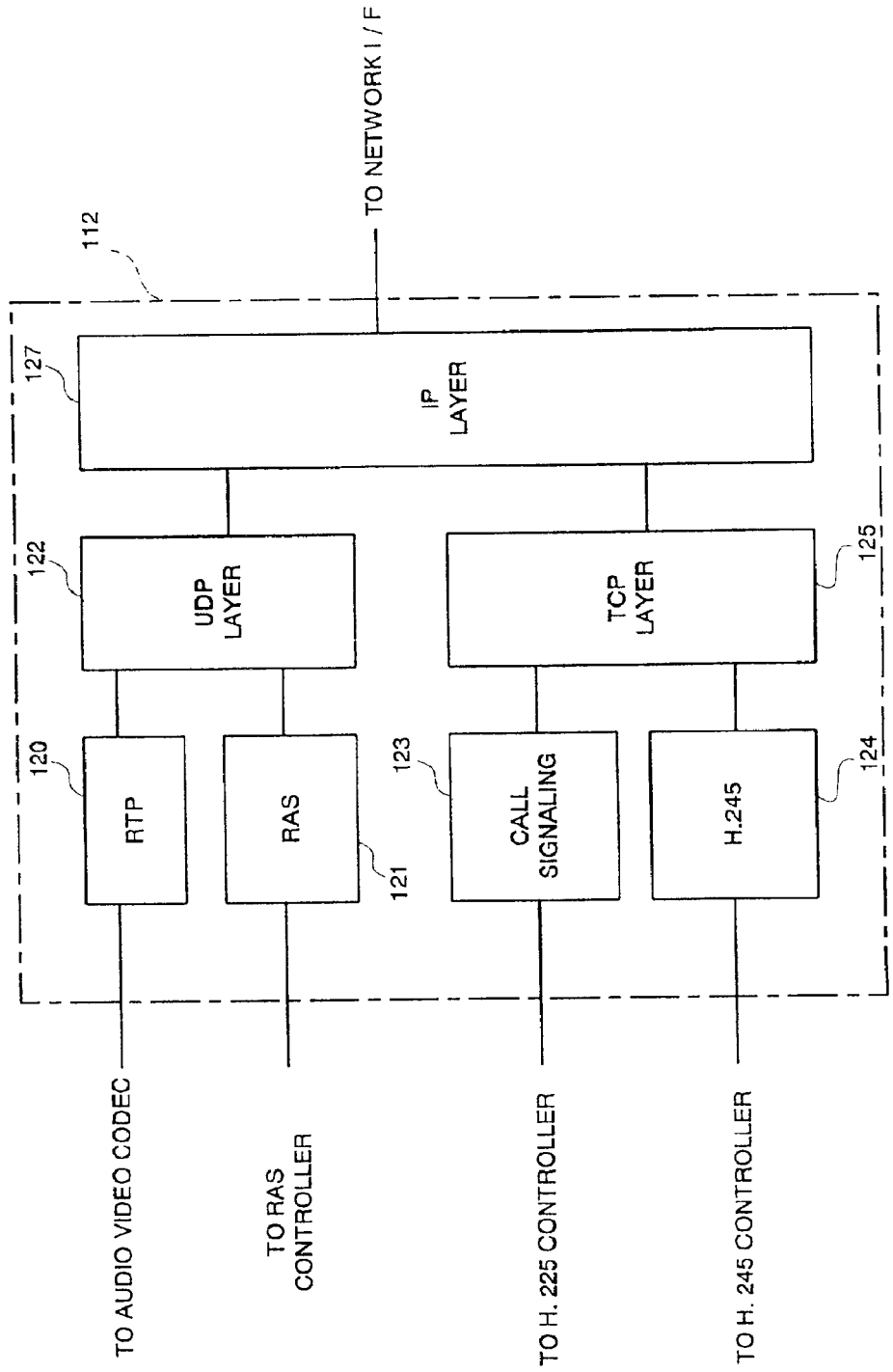
FIG. 9 is a view partially showing a specific example of FIG. 8.

FIG. 7 is a block diagram showing an example of a third embodiment.

Referring to FIG. 7, the example of the present embodiment comprises a video camera 18 for taking pictures of communication participants to output the video signal, an image compressor 19 for processing for image-compressing and coding the video signal being input to output the receiving compressed image data, an image expander 20 for processing for image-expanding and decoding the receiving compressed image data received from the companion terminal to output the regeneration image data and for simultaneously outputting the congestion information of the network to the network situation supervisory section 16, and a display 21 for displaying the regeneration image signal being input in addition to the example of the embodiment shown in FIG. 6.

Also, the transmission switching section 5 inputs the compressed voice data from the voice compressor 4, and simultaneously inputs the compressed image data from the image compressor 19.

Also, the reception synthesizer 13 outputs to the voice expander 14 the receiving compressed voice data that was synthesized, and simultaneously outputs to the image expander 20 the receiving compressed voice data that was synthesized.

Also, the network situation supervisory section 16 inputs the congestion information of the network from the image expander 20 as well.

The third example of the embodiment differs from the foregoing examples in these ways.

Next, the operation of the example of the present embodiment will be explained.

In FIG. 7, the video signal that the video camera output is processed for compressing and coding by the image compressor 19. The compressed image data that the image compressor 19 outputs is input to the transmission switching section 5. The transmission switching section 5 switches an output destination of the compressed image data being input to either the UDP transmitter 7 or the TCP transmitter 6 based on the transmission switching signal that is input from the network situation supervisory section 16 to output the transmission compressed voice data or the transmission compressed image data in similar way that the switching operation of the compressed voice data was carried out by the transmission switching signal that is input from the network situation supervisory section 16 in the example of the embodiment shown in FIG. 2 or FIG. 3.

Also, the reception synthesizer 13 processes for synthesizing the reception compressed voice data or the reception image data that is input from the UDP receiver 12 and the TCP receiver 11, and outputs the reception compressed voice data that was synthesized or the reception image data that was synthesized in similar way that the reception compressed voice data that was input from the UDP receiver 12 and the TCP receiver 11 was processed for synthesizing in the example of the embodiment shown in FIG. 2 or FIG. 4.

The reception compressed image data that was synthesized, which the synthesizer 13 outputs, is processed for image-expanding and decoding by the image expander 20, and finally, is displayed by the display 21.

In the image expander 20, the congestion situation of the network can be known by an error frequency of processing for expanding and decoding (decode error) in the expanding and decoding process of the compressed image data that was received. It means the confusion of the network that an error frequency of processing for expanding and decoding is high.

In accordance with the present invention an advantage can be effected: even though the network is in a confused situation, an obstacle to the voice call due to interruption of voice can be alleviated. The reason is that since the voice data is transmitted with the TCP protocol which is a reliable communication protocol in case that the network is in a confused situation, an obstacle does not occur to the voice call due to destruction or loss of the data voice that is caused by the confused network.

The entire disclosure of Japanese Patent No. 2000-110354 filed on Apr. 12, 2000 including specification, claims, drawing and summary are incorporated herein by reference in its entirety.

What is claimed is:

1. An internet telephone apparatus that transmits and receives a call data through an internet, comprising a switching controller for controlling and switching a protocol of data transfer responding to a congestion situation of said internet, wherein said switching controller is a controller for switching to a connectionless protocol when said internet is in a congestion situation below a threshold and for switching to a connection protocol when said internet exceeds said threshold.

2. The internet telephone apparatus according to claim 1, wherein said connectionless protocol is a UDP (User Data Protocol) and said connection protocol is a TCP (Transmission Control Protocol).

3. The internet telephone apparatus according to claim 1, wherein a receiver for receiving and processing a data received through said internet is included and said switching controller detects a congestion situation of said internet based on a receiving situation of said receiver.

4. An internet telephone apparatus that transmits and receives a call data through an internet, comprising a switching controller for controlling and switching a protocol of data transfer responding to a congestion situation of said internet wherein a receiver for receiving and processing a data received through said internet is included and said switching controller detects a congestion situation of said internet based on a receiving situation of said receiver, and wherein said switching controller includes a controller for detecting said congestion situation based on a CRC (Cyclic Redundancy Check) error frequency.

5. The internet telephone apparatus according to claim 1, wherein a voice compressor for compressing said call data is included and a compressed voice data is adapted to be delivered to said switching controller.

6. The internet telephone apparatus according to claim 5, wherein an image compressor for compressing an image data in addition to said call data is included and a compressed image data is adapted to be delivered to said switching controller together with said compressed voice data.

7. The internet telephone apparatus according to claim 6, wherein said receiver includes an expander for expanding said compressed data of said voice and image and said switching controller includes a controller for detecting said congestion situation responding to a processing error of expanding and decoding by said expander.

* * * * *